United States Patent

[11] 3,607,771

[72] Inventors Jerome S. Prener; Jack D. Kingsley, both of Schenectady, N.Y.

[21] Appl. No. 785,019
[22] Filed Dec. 6, 1968
[45] Patented Sept. 21, 1971
[73] Assignee General Electric Company
Continuation of application Ser. No. 518,311, Jan. 3, 1966, now abandoned.

[54] RARE EARTH-ACTIVATED SILVER AND COPPER-SENSITIZED ZINC AND CADMIUM SULFIDE PHOSPHORS
2 Claims, 7 Drawing Figs.

[52] U.S. Cl. ........ 252/301.4
[51] Int. Cl. ........ C09k 1/12
[50] Field of Search ........ 252/301.6 S

[56] References Cited
UNITED STATES PATENTS
3,269,956 8/1966 Larach et al. ........ 252/301.6 S

*Primary Examiner*—Tobias E. Levow
*Assistant Examiner*—R. D. Edmonds
*Attorneys*—Richard R. Brainard, Paul A. Frank, John T. Ahern, Edward D. Murphy, Frank L. Neuhauser, Melvin M. Goldenberg and Oscar B. Waddell

ABSTRACT: Phosphors exhibiting very narrow wavelength bands of high-intensity emission are composed of a chalcogenide host and activated with a rare earth and a noble metal. Zinc sulfide activated with erbium and sensitized with silver is an example of the phosphors.

Inventors:
Jerome S. Prener,
Jack D. Kingsley,
by Edward D. Murphy
Their Attorney.

Inventors:
Jerome S. Prener,
Jack D. Kingsley,
by Edward D. Murphy
Their Attorney.

RARE EARTH-ACTIVATED SILVER AND COPPER-SENSITIZED ZINC AND CADMIUM SULFIDE PHOSPHORS

This application is a continuation of application Ser. No. 518,311 filed Jan. 3, 1966, now abandoned. The present invention relates to improved phosphors adapted to emit electromagnetic radiation centered on a selectable wavelength.

Numerous materials are presently known which produce broadband electromagnetic radiation in various regions of the spectrum. However, for many of the potential applications of these materials, it is required that the radiation produced be very narrow in bandwidth. In many cases, it is preferred that the radiation be in the visible spectrum so that it can be seen or in the ultraviolet region so that it can act upon a material sensitive to ultraviolet radiation and that the particular wavelengths needed be selectable. Such applications include, for example, lasers, indicators, flashlamps and television phosphors. A further difficulty encountered in present phosphors is that only a few specific wavelengths are available. For the various applications, it is highly desirable that a large selection of different wavelengths be available. The purpose of the present invention is to provide phosphors in which these and other problems are overcome.

Accordingly, it is an object of the present invention to provide a new and improved class of phosphors for the emission of electromagnetic radiation.

A further object of this invention is the provision of new and improved phosphors for producing narrow-band emission predominantly in the visible and ultraviolet regions of the spectrum.

Another object of this invention is the provision of new and improved phosphors wherein the wavelength of the predominant radiation can be selected from a broad spectrum of options.

Briefly, in accord with one embodiment of the present invention, we provide a class of phosphors which comprise a crystalline material selected from the class generally known as the II–VI compounds and having incorporated therein an element selected from Group Ib of the Periodic Table and an element selected from the class known as the rare earths. The Ib element and the rare earth element are included in sufficient quantity to cause the emission of electromagnetic radiation, these quantities generally being between $10^{-2}$ and $10^{-6}$ mole fraction. Preferably, the quantities of these impurities are within a factor of $10^2$ of one another. For example, in a specific embodiment, we provide a monochromatic phosphor comprising a crystalline body of zinc sulfide activated with copper and also including erbium. The quantity of copper and of erbium included is approximately $10^{-4}$ mole fraction for each. In accord with our invention, the group Ib element acts as a sensitizer of the rare earth emission and the device predominantly produces electromagnetic radiation at a wavelength of 5550 A., in the visible spectrum. In another embodiment, copper and neodymium, in quantities equal to $10^{-4}$ mole fraction, have been found to produce visible radiation at 6050 A.

The novel features believed characteristic of the invention are set forth in the appended claims. The invention itself, together with further objects and advantages thereof may best be understood by reference to the following description taken in connection with the appended drawings in which:

Figures 1, 2, 3A, 3B, 3C:
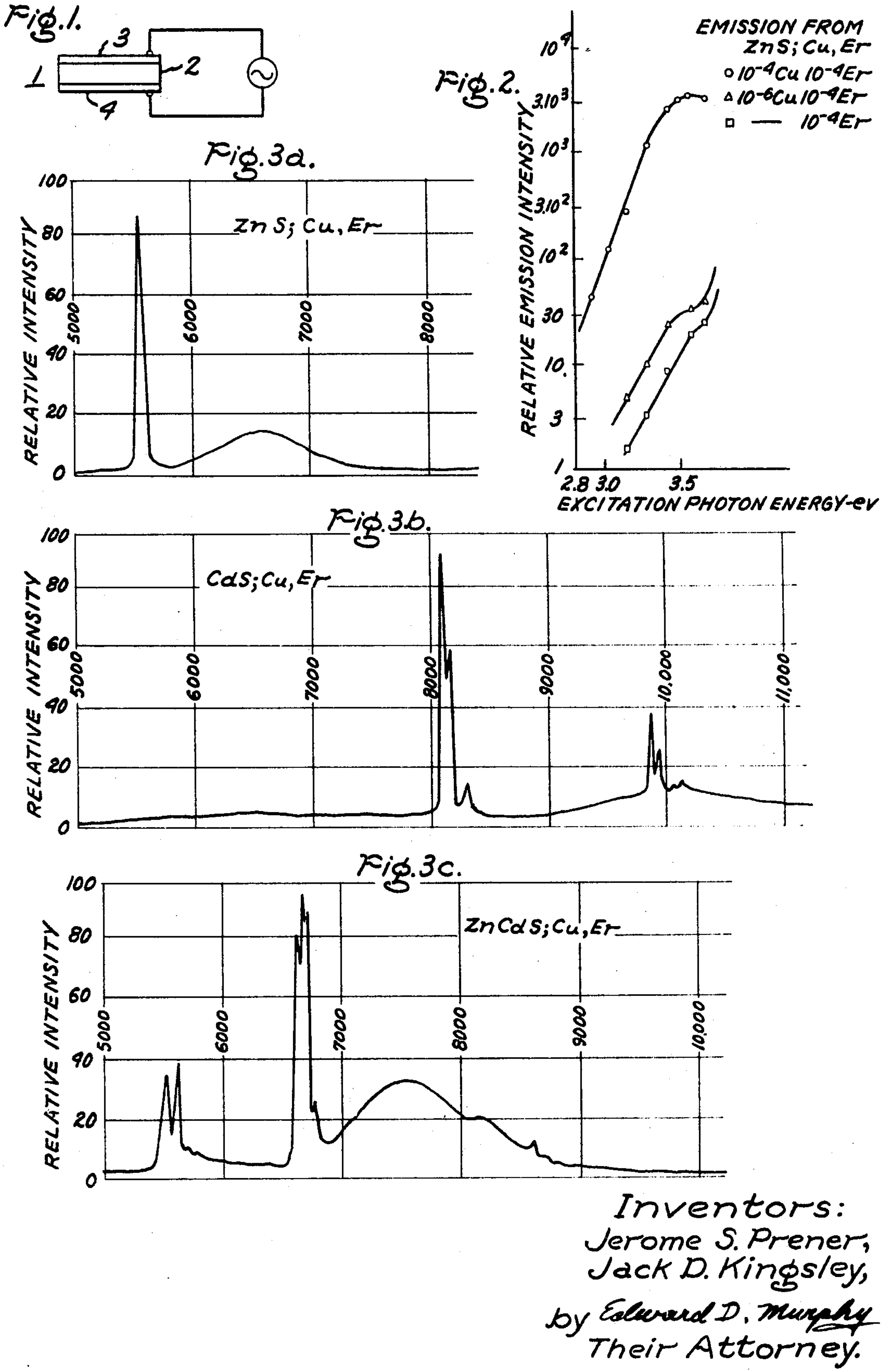
FIG. 1 is a perspective view of a specific embodiment of the present invention.
FIG. 2 illustrates a comparison of the light intensity obtained from various phosphors.
Figure 4A:
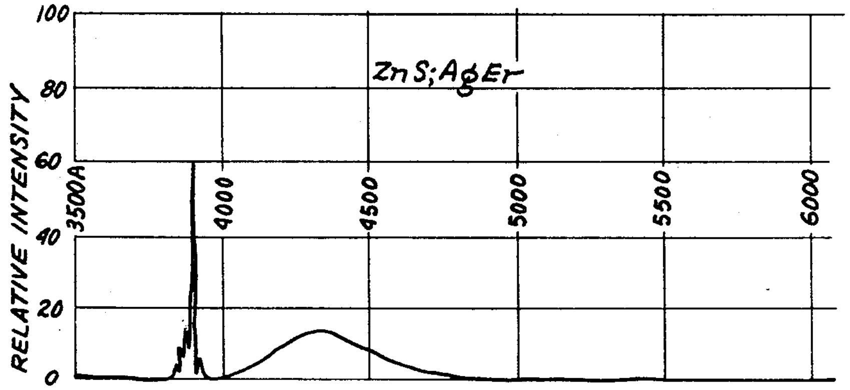
Figure 4B:
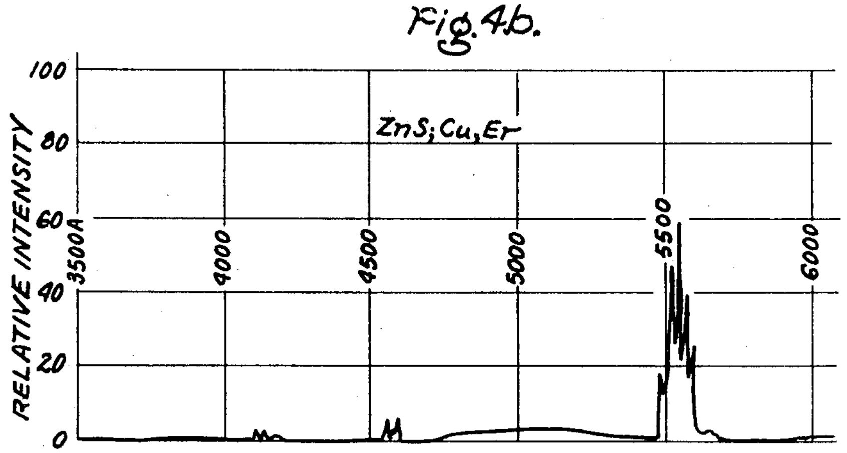

FIGS. 3A, 3B, and 3C illustrate emission spectra obtained from phosphors in accord with the present invention; and FIGS. 4A and 4B show emission spectra obtained from phosphors in accord with this invention. In FIG. 1, the specific application illustrated is an electroluminescent device 1 comprising a body 2 of a luminescent powdered phosphor dispersed in a dielectric binder such as polystyrene. Electrodes 3 and 4, one being transparent, are attached to opposite sides thereof so that a potential difference may be applied to produce electroluminescence. The luminescent phosphor, in accord with the present invention, comprises a compound selected from the group of materials which include a cation selected from Group IIb of the Periodic Table and an anion selected from Group VIa of the Periodic Table. The preferred phosphors are those comprising zinc or cadmium and oxygen, sulfur, selenium or tellurium. The term "II–VI compounds" has generally been used to describe these materials and is so used in the following specification and claims.

The II–VI compound functions as the host material for the impurities which produce emission, in this case electroluminescent emission. In general, the body 2 may be a powder, a thin film or a single crystal. The impurities, specifically an element of Group Ib and a rare earth element, are incorporated in the crystal lattice of the II–VI compound either during or after the preparation of the II–VI crystals. The impurities, when included in quantities in accord with the present invention, have been found to produce narrow-band emission, in many cases lying in the visible or ultraviolet region in response to stimulating energy such as an electric field, an electron beam or light of an appropriate wavelength. The wavelength of the output can be chosen from a wide range of selections.

In general, the amount of each of these impurities provided in the body is in the range of from $10^{-6}$ to $10^{-2}$ mole fraction. The mole fraction expresses the number of impurity atoms for each molecule of the II–VI material. It is preferred that the quantities of each impurity element introduced be within a factor of $10^2$ of one another to achieve a higher intensity output.

The present invention is predicated upon the discovery that, upon the application of excitation radiation having a wavelength which can be absorbed by the Group Ib element strong electromagnetic emission is obtained. The excitation energy is absorbed by the Group Ib impurities, transferred to the rare earth impurities thus raising these ions to an excited state, and finally emitted as electromagnetic radiation upon the return of the excited ion to a low energy state. Due to the inclusion of appropriate quantities of each element, the output obtained is of much higher intensity and predominates over other emissions. The inclusion of these elements has been found to enhance the intensity of the emission by as much as 300 times the intensity obtained from a II–VI crystal containing a rare earth impurity without the added Group Ib element.

To illustrate the improvement achieved through the use of the present invention, a comparison of the intensities of emission obtained in powders of zinc sulfide is shown in FIGURE 2. As indicated thereon, the plot displays the relative emission intensity as a function of the excitation energy for three samples. The curve A, through the observed points marked by square boxes, was taken from a sample containing only trace amounts of copper and $10^{-4}$ mole fraction of erbium. The curve B, through the points marked by triangles, is for a crystal which contained $10^{-6}$ mole fraction of copper and $10^{-4}$ mole fraction of copper and $10^{-4}$ mole fraction of erbium. As is illustrated by these curves, the inclusion of copper resulted in a marked improvement in the emission.

It is within the contemplation of this invention to provide more than one of any of the alternative elements in a given device so as to allow further choices of the emitted wavelength or to permit the emission of different wavelengths, depending on the wavelength of the stimulating energy. For example, we have found that in phosphors in accord with this invention, each rare earth activator impurity is capable of emitting in a number of characteristic narrow bands, each with a different wavelength. The relative intensities of these bands vary widely, depending on the Group Ib impurity incorporated with the rare earth and the particular II–VI compound employed as a host. In addition to the options permitted by varying the Ib sensitizing impurity and II–VI host, many additional choices are added by using mixed II–VI compound hosts such as $Zn_xCd_{1-x}S$ or $ZnSe_xTe_{1-x}$ to select other characteristic emission bands in addition to those excited by the pure II–VI compound Ib combinations.

This variation in emission is illustrated in FIGS. 3A, 3B and 3C. FIG. 3A shows that ZnS:Cu,Er emits in a narrow band, or group of lines, near 5,500 A. and FIG. 3B shows that CdS:Cu,Er emits most strongly in bands near 8,100 A. and 9,900 A. However, the mixed compound $An_{0.5}Cd_{0.5}S$:Cu,Er emits most strongly near 6,600 A. and somewhat less strongly near 5,500 A., as is shown in FIG. 3C. Thus, by adjusting the amounts of zinc and cadmium, these bands can be selected. As an illustration of the effect of changing the Group Ib impurity to achieve varying emission colors, FIGS. 4A and 4B respectively illustrate the emission spectra obtained from samples of ZnS:Ag,Er and ZnS:Cu,Er. In FIG. 4B, the emission is centered at 5,550 A., in 4A the line emission is near 3,900 A.

By incorporating two or three different kinds of Ib sensitizing impurities in a specific II–VI host along with a particular rare earth impurity a phosphor is produced with is capable of emitting in two or three different narrow bands. Furthermore, the relative emission intensities of these three bands may be altered by varying the wavelengths of the exciting radiation, thus producing a phosphor whose color may be quickly altered. As another illustration, if the available sources are limited by expense or other considerations, such a device may also be used to achieve a more efficient system since more of the energy from a source emitting in both of the absorption bands of the Ib elements would be absorbed than if only one of the elements were present. Finally, more than one rare earth element may be included in the device to provide an emission spectrum including line emission at each of the wavelengths corresponding to the respective rare earths. This may be used to produce a composite color or white.

The devices described herein may be prepared by methods presently known in the art. Microcrystalline materials may be prepared by direct reaction of the II–VI elements, or by precipitation of the II–VI compound from a solution, prepared by single crystals and the Ib and rare earth elements may be introduced by heating and diffusing them into the resultant powder. Single crystals may be prepared in accord with the method disclosed in the copending application of William Piper, Ser. No. 386,505, filed July 31, 1964, now U.S. Pat. No. 3,243,267 assigned to the assignee of the present invention. The impurities may be included in the charge from which the device is prepared or may be diffused into the device after preparation. Other methods of preparation may also be used.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

We claim:

1. A photoluminescent phosphor adapted to emit a first narrow wavelength band of electromagnetic radiation when excited by a second wavelength band of electromagnetic radiation and consisting essentially of zinc sulfide sensitized with silver and activated with erbium.

2. The phosphor of claim 1 wherein silver and erbium are each present in an amount ranging from 10'6 to 10'2 mole fraction.